G. E. BURT.
HORSE HAY-RAKE.
No. 186,031. Patented Jan. 9, 1877.
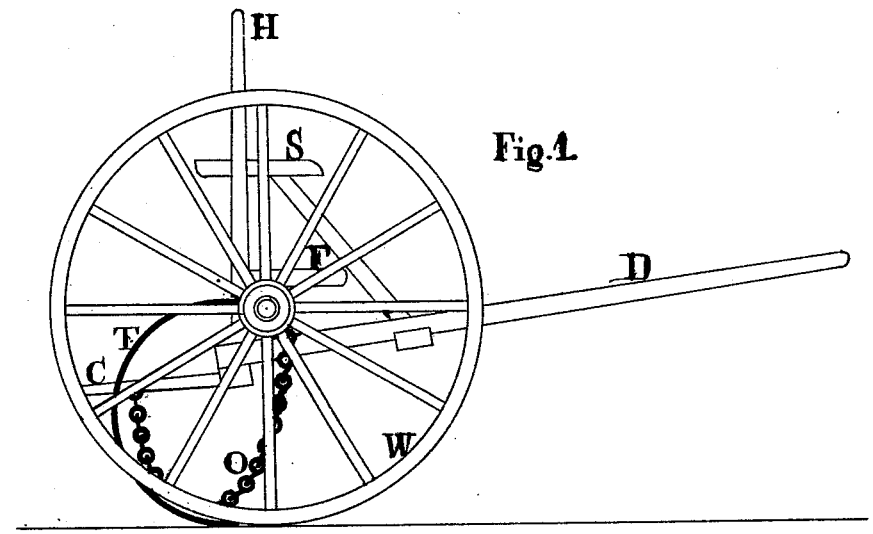
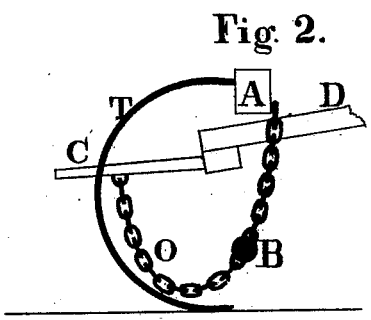
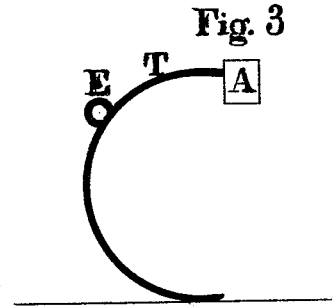
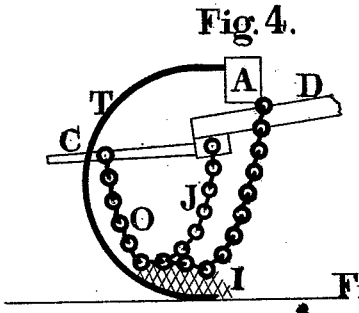
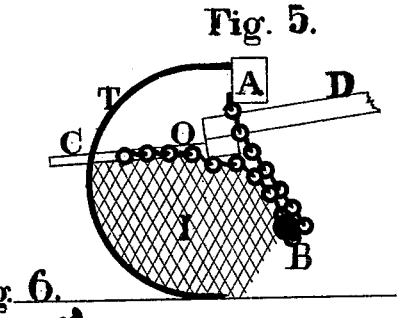
Witnesses.
E. A. Hildreth.
H. S. Hildreth
Inventor.
George E. Burt.

UNITED STATES PATENT OFFICE.

GEORGE E. BURT, OF HARVARD, MASSACHUSETTS.

IMPROVEMENT IN HORSE HAY-RAKES.

Specification forming part of Letters Patent No. 186,031, dated January 9, 1877; application filed September 18, 1875.

*To all whom it may concern:*

Be it known that I, GEORGE E. BURT, of Harvard, in the county of Worcester and State of Massachusetts, have invented certain Improvements in Horse Hay-Rakes, of which the following is a specification:

It is well known to persons who operate wire-tooth rakes that the hay is apt to roll in the rake, binding the hay together and making it more difficult to shake it out for drying. It is also more work to pitch hay that has been rolled. The hay, by revolving in the rake, will rope up, as it is called, and work out of the ends of the rake. This rolling of the hay and roping out at the ends of the rake is a great difficulty, especially where there is a light crop and the hay is dry. In raking rowen or second-crop hay, this scattering out of the rake is quite a serious matter. Also, in gleaning after a load there is sometimes so much hay left on the ground that economical farmers employ a hand or drag rake to collect these scatterings.

The object of this invention is to overcome the above difficulty. For this purpose I employ a flexible and yielding holder, constructed of any suitable material, and arranged or applied to the rake in such a manner as to come in contact with the hay and embrace it and hold it against the rake-teeth, and the weight and resistance of the holder, if properly applied, will increase upon the hay as it accumulates, counterbalancing the tendency of the hay to roll. This flexible holder also tends to hold the hay firmly in the rake on side-hills, and at all times causes the rake to rake the hay instead of rolling it.

From practical tests in the field with holders of various construction and with different kinds of material, a flexible chain of suitable weight and properly attached has been found to accomplish the desired result, being strong, cheap, and easily applied.

In the accompanying drawings, Figure 1 is a side view of a rake embodying my invention. Fig. 2 shows the holder O with an additional weight, B, added, to increase the power of the holder O. Fig. 3 shows a tooth constructed with a coil, to prevent the hay from working up onto the tooth, and to which the holder O can be attached. Fig. 4 shows the operation of the holder when the hay begins to accumulate in the rake. Fig. 5 shows the operation of the holder when the rake is filled with hay. Fig. 6 shows two of the binders O O, connected together at the lower part of the loop so as to be held at an angle across the face of the teeth.

Like letters represent like parts in all the figures.

To enable others skilled in the art to make and use my invention, I will proceed to describe its construction and operation.

I construct my rake in the usual manner with steel teeth T, seat S for the operator, hand-lever H, foot-lever F, clearers C, shafts D, and wheels W. But, in addition, I attach the holder O, constructed in sections or links, one end being attached to the axle and the other to the clearer C, or the loop E, or any other convenient places on the rake in such a manner that the holder will loop or hang down and come in contact with a small quantity of the hay that has been gathered with the rake-teeth, and rest upon and embrace it, as shown in Fig. 4.

The vibration of the end teeth and the rotary motion of the wheel tend to scatter out short hay or rowen. To remedy this difficulty, I attach to the binder O an end holder, J, one end of which is attached to the binder O, and the other end to the clearer-bar, or any other convenient part of the rake, as shown in Fig. 4, in such a manner that when the binder O is raised by hay accumulated by the rake the end binder will loop down over the hay next to the wheel, and hold it from scattering out, and will also tend to hold short hay or rowen from coming in contact with the spokes of the wheels.

It has been found from actual trial that very dry short hay has a much greater tendency to roll in any rake, and, being short, is much more likely to work out of the teeth. To overcome this extreme tendency to roll whenever necessary I connect the binders O O together at or near the bottom of their loops by hooks or any other device, (shown in Fig. 6,) in such a manner that the binders O O hang at an angle across the rake-teeth. Or a single binder may be placed on an angle with the line of the teeth, and in this position the binders exert more retarding force than when they are allowed to hang in a plane perpendicular to the axle of the rake, and in this position will effectually resist the rolling of the shortest hay. The holder O can also be placed in a plane perpendicular to the line of the axle, and in this position will offer a resistance to the hay that will prevent it from rolling under ordinary circumstances. The holder O, being made flexible, will yield to the hay, the pressure being very light at first on a small quantity of hay, but as the quantity of hay increases, the force of the holder is also increased. As the hay lifts it up more of the holder rests upon the hay and embraces it more firmly.

The weight B is attached to the upper part of the binder O, near the axle, in such a manner that when the rake is nearly filled, and the tendency of the hay to roll is largely increased, the weight B is lifted and causes the holder O more firmly to embrace the hay and overcome or resist the rolling force, as shown in Fig. 5, I representing the hay which has accumulated in the rake.

The end of the flexible binder O, which is attached to the forward part of the rake, may be made of heavier sections, if desired, instead of using the weight B in such a manner that as the load of the rake is increased heavier sections of the binder may be made to act upon the hay. But it has been found from field trials that a simple common chain will answer a good purpose, if of the right weight and length, and will make a good binder, and acts with increased force as the hay accumulates.

These binders can very readily be applied to any of the various rakes already in the market, but in constructing new rakes a loop or coil, if desired, may be made in the tooth C, as shown in Fig. 3. One end of the binder may be attached to this coil and the other end to the axle. This device of a coil in the back of the tooth will also be useful in keeping the hay from working up on the outside of the rake-teeth.

The operation of these binders O is such that the flexible binders embrace the hay gathered by the rake and effectually hold it in position, preventing the hay from scattering out of the rake, and effectually preventing the hay from rolling and roping out at the ends of the rake. The hay is thereby properly raked up, instead of being rolled along. These binders also facilitate the discharge of the rake, as their tendency is to force the hay down when the rake is tilted, thus acting as a flexible clearer as well as a binder.

Having described the nature and operation of my invention, what I claim as new, and desire to secure by Letters Patent, is—

1. The combination, with the teeth of a horse hay-rake, of the flexible yielding binder O, for the purpose of steadying and holding the material gathered, substantially as described.

2. The combination of the binder O, the clearer C, and the rake-teeth T, in a horse-rake, substantially as described, and for the purpose set forth.

3. The combination, with the teeth of a horse hay-rake, of a yielding weighted binder, substantially as described, and for the purpose set forth.

4. The combination of the binder O with the main frame of the rake in front and with the coil E on the rake-tooth, substantially as described.

5. The binders O O, when connected together or held at an angle across the face of the teeth, substantially as described, and for the purpose set forth.

GEORGE E. BURT.

Witnesses:
E. A. HILDRETH,
H. S. HILDRETH.